United States Patent [19]

Wild

[11] Patent Number: 5,263,284

[45] Date of Patent: Nov. 23, 1993

[54] METHOD OF SIMULTANEOUSLY CORRECTING EXCESSIVE RADIAL FORCE VARIATIONS AND EXCESSIVE LATERAL FORCE VARIATIONS IN A PNEUMATIC TIRE

[75] Inventor: Joyce R. Wild, Tega Cay, S.C.

[73] Assignee: General Tire, Inc., Akron, Ohio

[21] Appl. No.: 979,819

[22] Filed: Nov. 20, 1992

[51] Int. Cl.$^5$ ............................................. B24B 49/00
[52] U.S. Cl. ................... 51/165.71; 51/165 R; 51/165.77; 51/281 R; 51/289 R
[58] Field of Search ........... 51/165 R, 165.71, 165.77, 51/326, 28 R, 289 R, DIG. 33

[56] References Cited

U.S. PATENT DOCUMENTS

| | | |
|---|---|---|
| 2,079,585 | 5/1937 | Sioman . |
| 2,080,227 | 5/1937 | Periat et al. . |
| 2,193,734 | 3/1940 | MacCracken . |
| 2,640,727 | 6/1953 | Kennedy . |
| 2,678,678 | 5/1954 | Kuechenmeister . |
| 2,695,520 | 11/1954 | Karsai . |
| 2,731,887 | 1/1956 | Sjostrand . |
| 2,765,845 | 10/1956 | Bullis . |
| 2,766,563 | 10/1956 | Bennett . |
| 2,869,362 | 1/1959 | Gough et al. . |
| 2,897,882 | 4/1959 | Barrett . |
| 2,918,116 | 12/1959 | Mooney . |
| 2,920,481 | 1/1960 | Hulswit, Jr. et al. . |
| 2,924,048 | 2/1960 | Sjostrand . |
| 2,966,011 | 12/1960 | Peacock . |
| 3,060,733 | 10/1962 | Herzegh . |
| 3,375,714 | 4/1968 | Bottasso . |
| 3,491,493 | 1/1970 | Deist . |
| 3,500,681 | 3/1970 | Shively . |
| 3,527,103 | 9/1970 | Hale et al. . |
| 3,543,576 | 12/1970 | Bishop . |
| 3,553,903 | 1/1971 | Christie . |
| 3,574,973 | 4/1971 | Rader . |
| 3,681,877 | 8/1972 | Shively et al. . |
| 3,724,137 | 4/1973 | Hofelt, Jr. et al. . |
| 3,725,163 | 4/1973 | Hofelt, Jr. . |
| 3,739,533 | 6/1973 | Iida et al. . |
| 3,817,003 | 6/1974 | Monajjem . |
| 3,848,368 | 11/1974 | Toshioka et al. . |
| 3,849,942 | 11/1974 | Monajjem . |
| 3,914,907 | 10/1975 | Hofelt, Jr. et al. . |
| 3,946,527 | 3/1976 | Beer . |
| 3,948,004 | 4/1976 | Gruber ............................. 51/165 R |
| 4,047,338 | 9/1977 | Gormish et al. . |
| 4,128,969 | 12/1978 | Gormish et al. . |
| 4,173,850 | 11/1979 | Gormish et al. . |
| 4,914,869 | 4/1990 | Bayonnet et al. . |
| 4,984,393 | 1/1991 | Rogers, Jr. ................... 51/DIG. 33 |

OTHER PUBLICATIONS

U.S. application Ser. No. 07/833,278, filed Feb. 10, 1992.

*Primary Examiner*—Jack Lavinder
*Attorney, Agent, or Firm*—Calfee, Halter & Griswold

[57] ABSTRACT

A method for simultaneously correcting excessive radial force variations and excessive lateral force variations in a pneumatic tire is provided. The method includes the steps of indexing the tire tread into a series of circumferential increments I(n), and obtaining a series of radial force measurements corresponding to these increments and a series of lateral force measurements corresponding to these increments. A radial grind component $R_{SGR}(n)$, a first lateral grind component $L^1_{SGR}(n)$, and a second lateral grind component $L^2_{SGR}(n)$ are generated for each of the increments I(n). These grind components represent the amount of material removal necessary to correct for either excessive radial force variations or excessive lateral force variations in the tire. The grind components $R_{SGR}(n)$, $L^1_{SGR}(n)$, and $L^2_{SGR}(n)$ are used to generate first and second radial/lateral grind components $R/L^1_{SGR}(n)$ and $R/L^2_{SGR}(n)$ which represent the amount of material removal on the first and second shoulders regions, respectively, of each increment I(n) necessary to simultaneously correct excessive radial and lateral force variations. Material is then removed for the first and second shoulder regions of each increment I(n) according to the value of the corresponding first radial/lateral grind component $R/L^1_{SGR}(n)$ and the value of the corresponding second radial/lateral grind component $R/L^2_{SGR}(n)$, respectively.

28 Claims, 9 Drawing Sheets

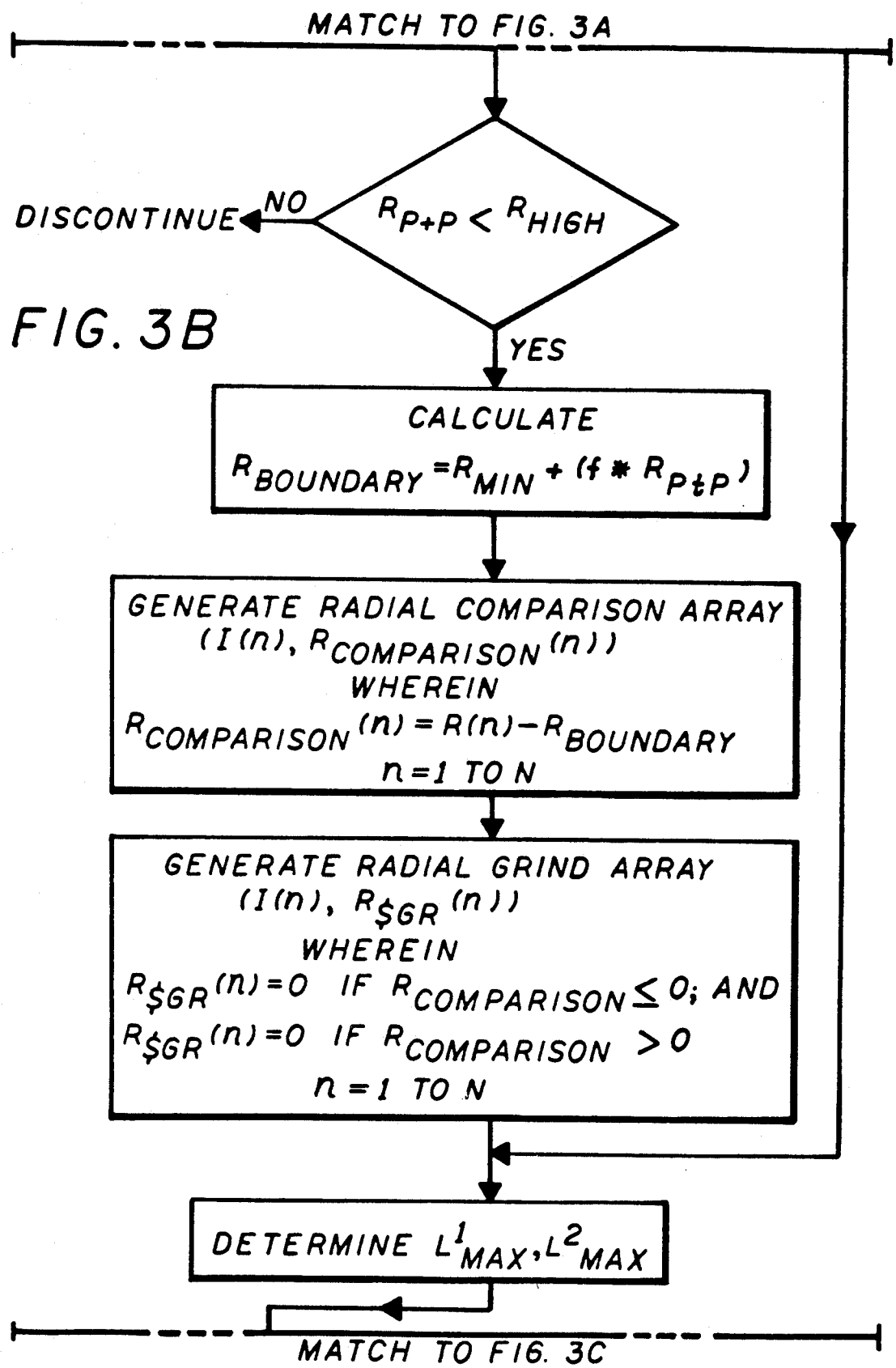

FIG. 3E

MATCH TO FIG. 3D →

GENERATE MULTIPLIER ARRAY
$(I(n), R/L_{MULTIPLIER}(n))$
WHEREIN
$R/L_{MULTIPLIER}(n) = R/L_f$ IF $R_{\$GR} > 0$ AND $L^1_{\$GR} > 0$ OR
IF $R_{\$GR} > 0$ AND $L^2_{\$GR} > 0$ AND
$R/L_{MULTIPLIER}(n) = 1$ IF $R_{\$GR} = 0$ OR $L^1_{\$GR} = 0$ AND
IF $R_{\$GR} = 0$ OR $L^2_{\$GR} = 0$

→

GENERATE RADIAL/LATERAL GRIND ARRAY
$(I(n), R/L^1_{\$GR}(n), R/L^2_{\$GR}(n))$
WHEREIN
$R/L^1_{\$GR}(n) = R/L_{MULTIPLIER} * (R_{\$GR}(n) + L^1_{\$GR}(n))$; AND
$R/L^1_{\$GR}(n) = R/L_{MULTIPLIER} * (-R_{\$GR}(n) + L^1_{\$GR}(n))$

METHOD OF SIMULTANEOUSLY CORRECTING EXCESSIVE RADIAL FORCE VARIATIONS AND EXCESSIVE LATERAL FORCE VARIATIONS IN A PNEUMATIC TIRE

FIELD OF THE INVENTION

This invention relates to a method of simultaneously, accurately, and efficiently, correcting excessive radial force variations and excessive lateral force variations in a pneumatic tire.

BACKGROUND AND SUMMARY OF THE INVENTION

In the construction of pneumatic tires, it is believed to be virtually impossible to economically manufacture an absolutely uniform tire because of the many variables involved in a tire's construction. Consequently, pneumatic tires, as manufactured, almost inevitably possess a certain degree of non-uniformity. The effects of non-uniformity are best explained by noting that several types of forces are simultaneously exerted by a tire during its rotation under load against a surface. For example, radial forces, which are of particular importance in the present application, are exerted in the radial direction of the tire, or in a direction perpendicular to its plane of rotation. Additionally, lateral forces, which are also of particular importance in the present application, are exerted in the axial direction of the tire or in a direction parallel to its plane of rotation. In a non-uniform tire, the radial and lateral forces exerted by the tire will vary or change during its rotation. In other words, the magnitude and/or direction of the radial and lateral forces exerted by the tire will depend on which increment of its tread is contacting the surface.

The variations in radial and lateral force during rotation of a tire is usually caused by differences in the stiffness and/or geometry of the tire about its circumference, or tread. If these differences are slight, the radial and lateral force variations will be insignificant and their effects unnoticeable when the tire is installed on a vehicle. However, when such differences reach a certain level, the radial and/or lateral force variations may be significant enough to cause rough riding conditions and/or difficult handling situations.

Consequently, methods have been developed in the past to correct for excessive force variations by removing material from the shoulders of the tire. Most of these correction methods include the steps of indexing the tire tread into a series of circumferential increments and obtaining a series of force measurements representative of the force exerted by the tire as these increments contact a surface. This data is then interpreted and material is removed from the tire tread in a pattern related to this interpretation. These methods are commonly performed with a tire-uniformity machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. In a sophisticated tire-uniformity machine, the force measurements are interpreted by a computer and material is removed from the tire tread by grinders controlled by the computer.

Some correction methods are designed to correct only for excessive radial force variations and any excessive lateral force variations are ignored. (See e.g., U.S. Pat. No. 4,914,869; U.S. Pat. No. 3,914,907; U.S. Pat. No. 3,849,942; U.S. Pat. No. 3,848,368; U.S. Pat. No. 3,817,003; U.S. Pat. No. 3,724,137; U.S. Pat, No. 3,681,877; U.S. Pat. No. 3,574,973; U.S. Pat. No. 3,553,903; and U.S. Pat. No. 3,491,493.) Other correction methods are designed to correct only for excessive lateral force variations and any excessive radial force variations are ignored. (See e.g., U.S. Pat. No. 4,047,338; U.S. Pat. No. 3,946,527; and U.S. patent application No. 07/833,378.) Consequently, these methods do not simultaneously correct for both excessive radial force variations and excessive lateral force variations.

The present invention provides a method of simultaneously, efficiently, and accurately, correcting excessive radial force variations and excessive lateral force variations in a pneumatic tire. The method is preferably performed with a tire uniformity machine including a freely rotating loading drum, an assembly which rotates the tire against the loading drum, measurement devices which measure the lateral force and radial force exerted by the tire as it rotates against the loading drum, grinders which are adapted to move into and out of cutting engagement with the tire tread shoulders, and a computer which interprets the measurements and which controls the grinders.

More particularly, the present invention provides a correction method including the steps of indexing the tire tread into a series of circumferential increments $I(n)$, and obtaining a corresponding series of radial force measurements $R(n)$ and a corresponding series of lateral force measurements $L(n)$. A radial grind component $R_{SGR}(n)$ is then generated, for each of the increments $I(n)$, which represents the amount of material removal necessary to correct excessive radial force variations. A first lateral grind component $L^1_{SGR}(n)$ and a second lateral grind component $L^2_{SGR}(n)$ are also generated for each of the increments $I(n)$. The first lateral grind component $L^1_{SGR}(n)$ represents the amount of material removal on the first shoulder necessary to correct excessive lateral force variations, and the second lateral grind component $L^2_{SGR}(n)$ represents the amount of material removal on the second shoulder of the tire tread necessary to correct excessive lateral force variations.

The radial grind component $R_{SGR}(n)$ and the lateral grind components $L^1_{SGR}(n)$ and $L^2_{SGR}(n)$ are used to generate a first radial/lateral grind component $R/L^1_{SGR}(n)$ and a second radial/lateral grind component $R/L^2_{SGR}(n)$ for each of the increments $I(n)$. The first radial/lateral grind component $R/L^1_{SGR}(n)$ represents the amount of material removal from the first shoulder region of the increment $I(n)$ which is necessary to simultaneously correct excessive radial and lateral force variations in the tire. The second radial/lateral grind component $R/L^2_{SGR}(n)$ represents the amount of material removal from the second shoulder region of the increment $I(n)$ which is necessary to simultaneously correct excessive radial and lateral force variations in the tire. Material is then removed from the first and second shoulder regions of each increment $I(n)$ according to the value of the corresponding first radial/lateral grind component $R/L^1_{SGR}(n)$ and the value of the corresponding second radial/lateral grind component $R/L^2_{SGR}(n)$, respectively. In this manner, an increment-by-increment analysis of both excessive radial force variations and excessive lateral force variations is used in the generation of the radial/lateral grind components $R/L^1_{SGR}(n)$ and $R/L^2_{SGR}(n)$. Such an analysis is believed to accurately, efficiently, and simultaneously correct for excessive radial force variations and excessive lateral force variations in a pneumatic tire.

Preferably, the step of generating the first radial/lateral grind component $R/L^1_{SGR}(n)$ includes adding the corresponding radial grind component $R_{SGR}(n)$ and the corresponding first lateral grind component $L^1_{SGR}(n)$. The step of generating the second radial/lateral grind component $R/L^2_{SGR}(n)$ preferably includes adding the negative of the corresponding radial grind component $R_{SGR}(n)$ and the corresponding second lateral grind component $L^1_{SGR}(n)$.

More preferably, the step of generating the radial/lateral grind components $R/L^1_{SGR}(n)$ and $R/L^2_{SGR}(n)$ further includes generating, for each increment $I(n)$, a radial/lateral multiplier $R/L_{multiplier}(n)$. The sum of the radial grind component $R_{SGR}(n)$ and the first lateral grind component $L^1_{SGR}(n)$ is multiplied by the corresponding radial/lateral multiplier $R/L_{multiplier}(n)$ to generate the first radial/lateral grind component $R/L^1_{SGR}(n)$. The sum of the negative of the radial grind component $R_{SGR}(n)$ and the second lateral grind component $L^2_{SGR}(n)$ is multiplied by the corresponding radial/lateral multiplier $R/L_{multiplier}(n)$ to generate the first radial/lateral grind component $R/L^1_{SGR}(n)$.

Even more preferably, the grind factors $R_{SGR}(n)$, $L^1_{SGR}(n)$, and $L^2_{SGR}(n)$ are used to generate the radial/lateral multiplier $R/L_{multiplier}(n)$. Specifically, if, for a particular increment $I(n)$, the radial grind component $R_{SGR}(n)$ is equal to zero or if either of the lateral grind components $L^1_{SGR}(n)$ or $L^2_{SGR}(n)$ is equal to zero; the corresponding radial/lateral multiplier $R/L_{multiplier}(n)$ is set equal to a default value of 1.0. (In such a situation, the profile of this particular increment $I(n)$ is responsible for either (but not both) excessive radial force variations or excessive lateral force variations in the tire.) However, if, for a particular increment $I(n)$, the radial grind component $R_{SGR}(n)$ is a non-zero value and either of the lateral grind components $L^1_{SGR}(n)$ or $L^2_{SGR}(n)$ is a non-zero value, the corresponding $R/L_{multiplier}$ is set equal to a fractional value $R/Lf$. (In such a situation, the profile of this particular increment $I(n)$ is responsible for both excessive radial force variations and excessive lateral force variations in the tire.)

In the past, methods have been developed in an attempt to correct both excessive radial force variations and excessive lateral force variations in a tire. For example, in U.S. Pat. No. 3,948,004 to Gruber, a method is disclosed in which a resultant vector is created representing radial and lateral force variations. The tangent angle $\alpha$ of this vector (which is equal to the tangential inverse of the lateral force variation divided by the radial force variation) is used to determine the appropriate material removal pattern. Specifically, if the angle $\alpha$ is less than 45° (and thus the radial force variation exceeds the lateral force variation) material is mainly removed in the radial direction by approaching two grinders to the tire shoulders with the same force. If the angle $\alpha$ is between 45° and 90° (and thus the radial force variation is less than or equal to the lateral force variation) material is mainly removed in the lateral direction with one of the grinders approaching the tire with a force exceeding that of the other grinder on every other rotation of the tire. Thus, the Gruber method appears to correct for either excessive radial force variations or lateral force variations, depending on which variations are dominant (i.e. depending on whether the angle $\alpha$ is less than or greater than 45°).

Additionally, U.S. Pat. No. 3,739,533 to Iida et al. discloses a correction method comprising the steps of generating first and second composite signals, and removing the shoulder rubber of the tire in response to these composite signals. In generating the composite signals, the Iida method determines: a radial force variation corrective signal which represents the difference between the measured radial force variation and a predetermined maximum allowable limit; a "positive" lateral force deviation corrective signal which is proportional to the magnitude of the mean of positive lateral force variations; and a "negative" lateral force deviation corrective signal which is proportional to the magnitude of the mean of negative lateral force variations. The first composite signal is generated by adding the radial force variation corrective signal and the "positive" lateral force deviation corrective signal. The second composite signal represents the sum of the radial force variation correction signal and the absolute value of the "negative" lateral force deviation corrective signal. Thus, the Iida method only take into account the mean of the lateral force deviations when generating its composite signals.

Applicant believes that the correction method of the present invention simultaneously corrects for excessive radial force variations and excessive lateral force variations in a pneumatic tire in manner which is more efficient and/or more accurate than the simultaneous correction methods of the prior art. Specifically, in contrast to the Gruber method, both excessive radial force variations and excessive lateral force variations are used in the generation of the radial/lateral grind components $R/L^1_{SGR}(n)$ and $R/L^2_{SGR}(n)$. Furthermore, in contrast to the Iida method, an increment-by-increment analysis of excessive lateral force variations (rather than simply a mean of lateral force deviations) is used in the generation of the radial/lateral grind components $R/L^1_{SGR}(n)$ and $R/L^2_{SGR}(n)$.

These and other features of the invention are fully described and particularly pointed out in the claims. The following description and annexed drawings set forth in detail one illustrative embodiment of the invention. However this embodiment is indicative of but one of the various ways in which the principles of the invention may be employed.

BRIEF DESCRIPTION OF THE DRAWINGS

In the annexed drawings:

FIGS. 3A-3E collectively form a flow chart of a computer program which may be used to interpret force measurements and control material removal according to the present invention;

DETAILED DESCRIPTION

Figures 1, 2, 3:
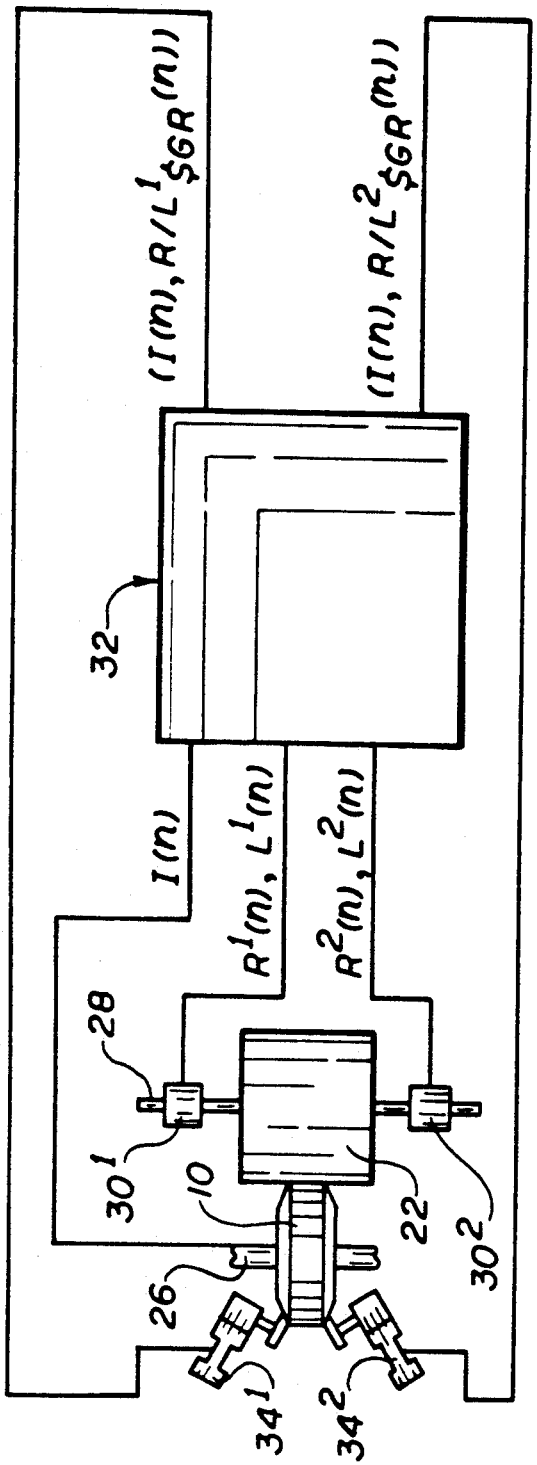
FIG. 1 a diagram, partly in block form, which schematically illustrates a method for simultaneously correcting excessive radial force variations and excessive lateral force variations in a pneumatic tire.
FIG. 2 is an enlarged view of the tread of the tire shown in FIG. 1.
Figure 3A:
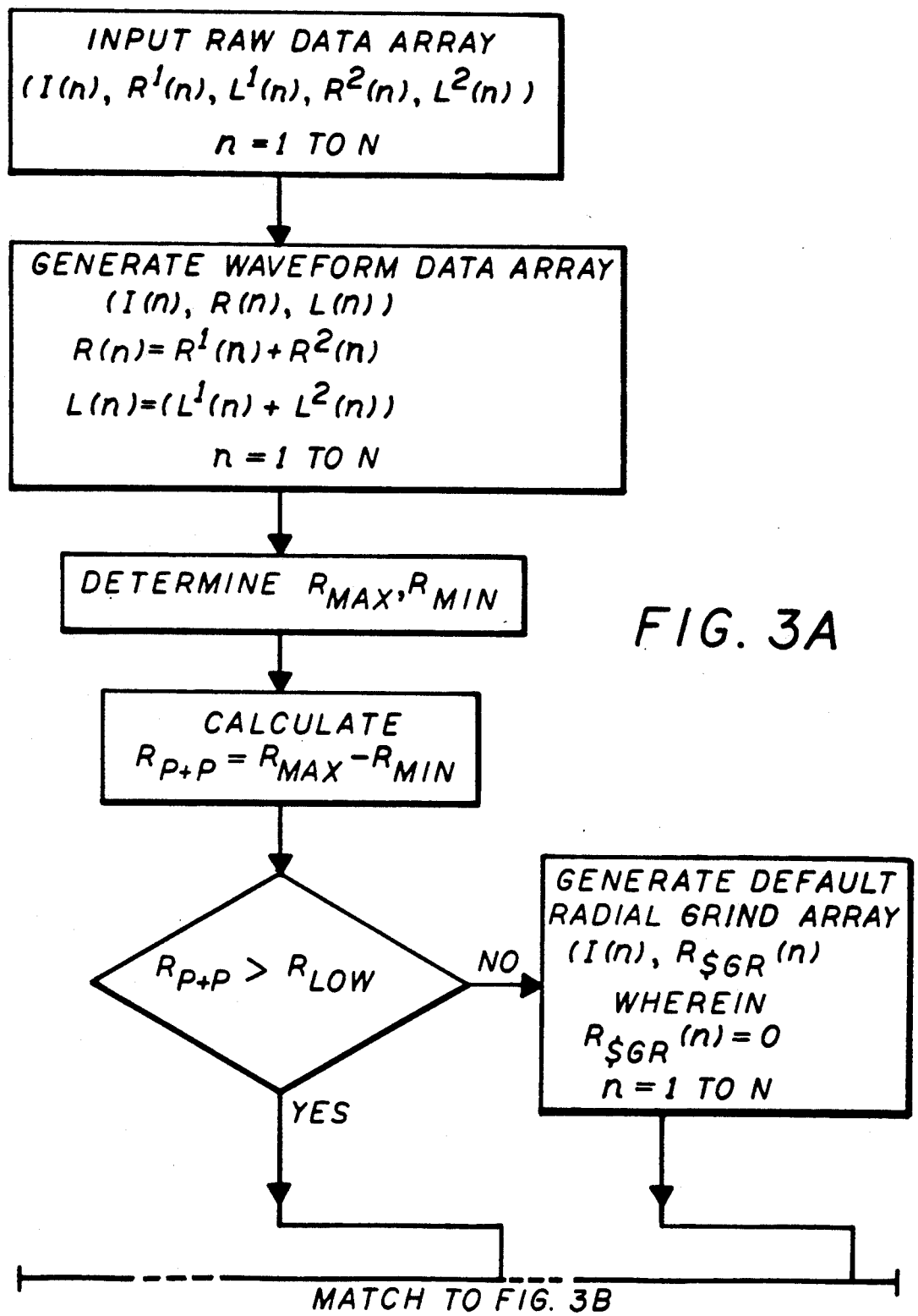
Figure 3C:
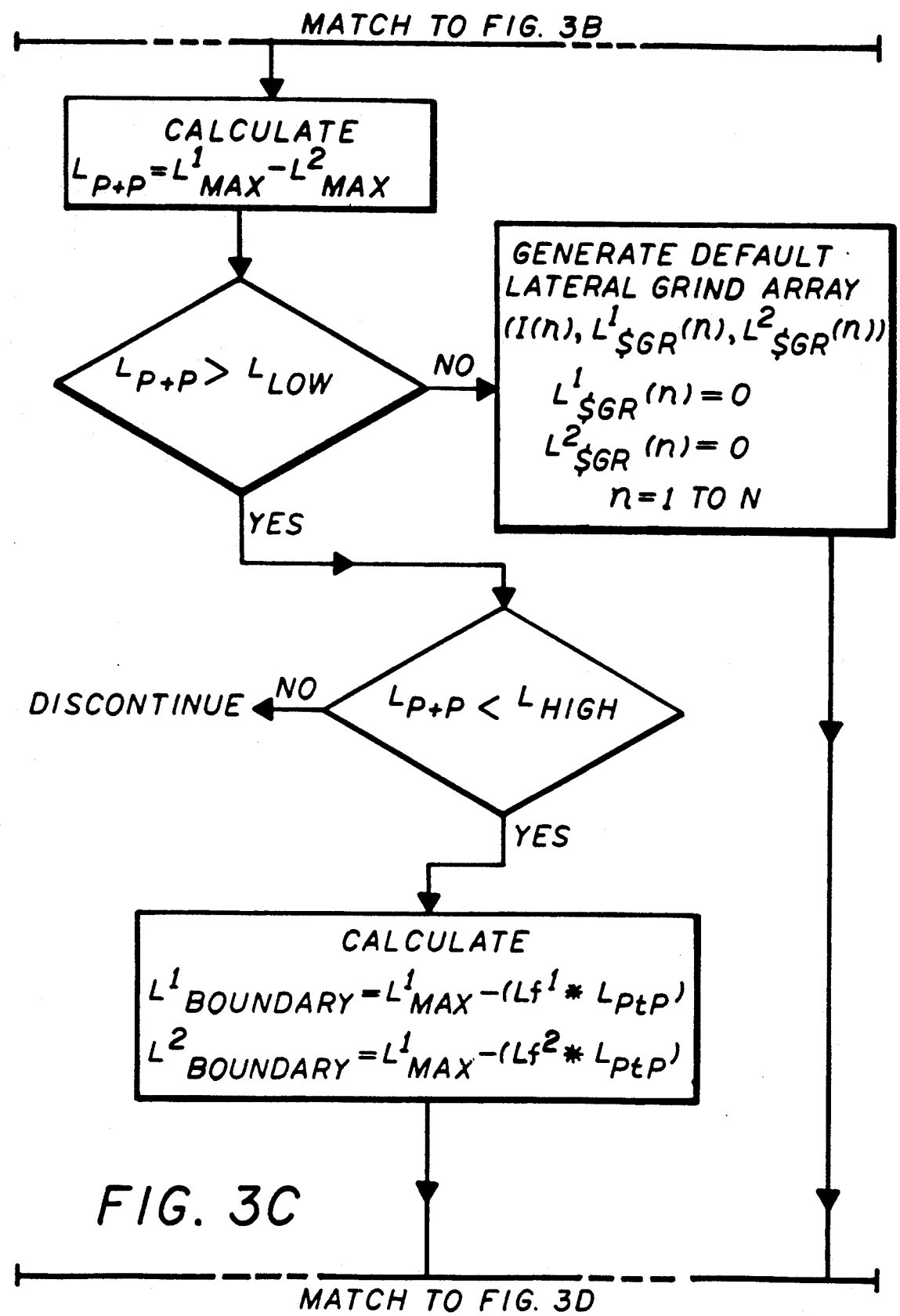
Figure 3D:
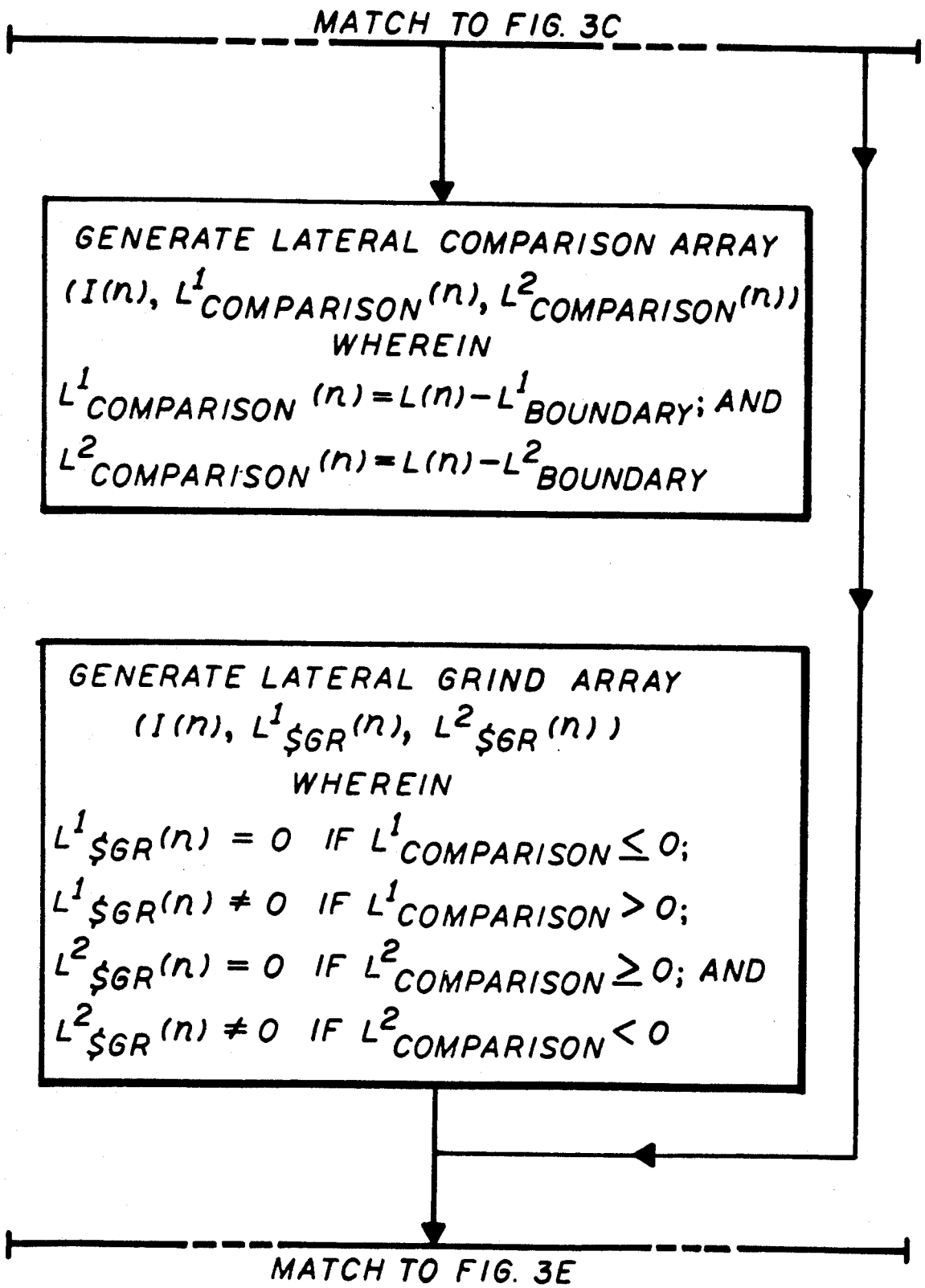

Referring now to the drawings in detail, and initially to FIG. 1, a method of simultaneously correcting for excessive radial force variations and excessive lateral force variations in a pneumatic tire 10 is schematically illustrated. As shown, the tire 10 has a circumferential tire tread 12 which includes a first shoulder $12^1$ and a second shoulder $12^2$. (See FIG. 2.) In the illustrated diagram, the tire 10 is horizontally oriented whereby the tread shoulder $12^1$ is the top shoulder and the tread shoulder $12^2$ is the bottom shoulder.

The tire tread 12 is initially indexed into a series of circumferential increments 12(1−N), each of which includes a first shoulder region and a second shoulder region. (See FIG. 2.) As such, the circumferential increments 12(1−N) may be viewed as collectively including first shoulder regions $12^1$(1−N) and second shoulder regions $12^2$(1−N). The number ("N") of the increments 12(1−N), and their size and spacing, are chosen so that the radial force variations and the lateral force variation of the tire 10 will be accurately represented. In the illustrated embodiment, the tire tread 12 is indexed into 128 equally sized and equally spaced increments.

The increments 12(1−N) are assigned identifiers I(1−N) for reference during the correction method. For example, the identifiers I(1−N) could represent the relative angular location of the increment on the tire tread (i.e. 2°, 4°, . . . 360°). Alternatively, the identifiers I(1−N) could simply represent the sequential order of the increments 12(1−N) on the tire tread 12 (i.e. , 1, 2, 3, . . . N). This latter convention will be adopted in the present discussion, whereby in the illustrated embodiment the identifiers I(1−N) consist of the numerals 1 through 128.

In the method of the present invention, excessive radial and lateral force variations in the tire 10 are simultaneously corrected by removing material from certain regions of the tire tread 12, namely its shoulders $12^1$ and $12^2$. The method generally includes the steps of obtaining a series of radial force measurements representative of the radial force exerted by the tire 10 as the circumferential increments 12(1−N) sequentially contact a surface and obtaining a series of lateral force measurements representative of the lateral force exerted by the tire 10 as the circumferential increments 12(1−N) sequentially contact a surface. This data is then interpreted and material is removed from the tire tread 12 in a pattern related to this interpretation.

The correction method is preferably performed with a tire-uniformity machine 20. The schematically illustrated machine 20 includes an assembly for rotating the tire 10 against the surface of a freely rotating loading drum 22. More particularly, the machine 20 includes a rotating axle 26 on which the tire 10 is mounted for controlled rotation and a non-rotating axle 28 on which the loading drum 22 is mounted for free rotation. This arrangement results in the loading drum 22 being moved in a manner dependent on the forces exerted by the tire 10 as it rotates. The radial and lateral components of these forces are measured by appropriately placed measurement devices $30^1$ and $30^2$ positioned along the drum axle 28 and these measurements are conveyed to a computer 32. The computer 32 interprets the measurements and controls the grinders $34^1$ and $34^2$ (which are adapted to move into and out of cutting engagement with the tire tread shoulders $12^1$ and $12^2$, respectively) to remove material from the tire tread 12 in a manner related to this interpretation.

During an initial stage of the method, the measurement device $30^1$ conveys to the computer 32 signals $R^1$(1−N) and $L^1$(1-N) which represent the radial force measurements and the lateral force measurements, respectively, as each of the increments 12(1−N) of the tire tread 12 contacts the loading drum 22. Concurrently, the measurement device $30^2$ conveys to the computer 32 signals $R^2$(1−N) and $L^2$(1−N) which represent the radial force measurements and the lateral force measurements, respectively, as each of the increments 12(1−N) of the tire tread 12 contacts the loading drum 22. Increment identifier signals I(1−N) corresponding to the increments 12(1−N) being measured are also concurrently conveyed to the computer 32. Thus, as shown schematically in FIG. 1, and as is depicted on the flow chart of FIG. 3, the computer 32 will receive the following raw data array:

$$(I(n), R^1(n), L^1(n), R^2(n), L^2(n))$$

wherein n = 1−N (N=128 in the illustrated example);

I(n) = the identifier of the increment 12(n) contacting the loading drum 22;

$R^1(n)$ = the radial force measurement taken by the first measuring device $30^1$ when the increment 12(n) contacts the loading drum 22;

$L^1(n)$ = the lateral force measurement taken by the first measuring device $30^1$ when the increment 12(n) contacts the loading drum 22;

$R^2(n)$ = the radial force measurement taken by the second measuring device $30^2$ when the increment 12(n) contacts the loading drum 22; and $L^2(n)$ = the lateral force measurement taken by the second measuring device $30^2$ when the increment 12(n) contacts the loading drum 22.

The computer 32 is programmed to convert this array of raw data into the following waveform data array:

$$(I(n), R(n), L(n))$$

wherein $$R(n) = R^1(n) + R^2(n).$$

$$L(n) = (L^1(n) + L^2(n)).$$

Thus, the variable R(n) represents the radial force exerted by the tire 10 when the corresponding tread increment 12(n) contacts the loading drum 22; and the variable L(n) represents the sum of the lateral force measurements, and therefore the total lateral force exerted by the tire 10, when the corresponding tread increment 12(n) contacts the loading drum 22.

Figure 4:
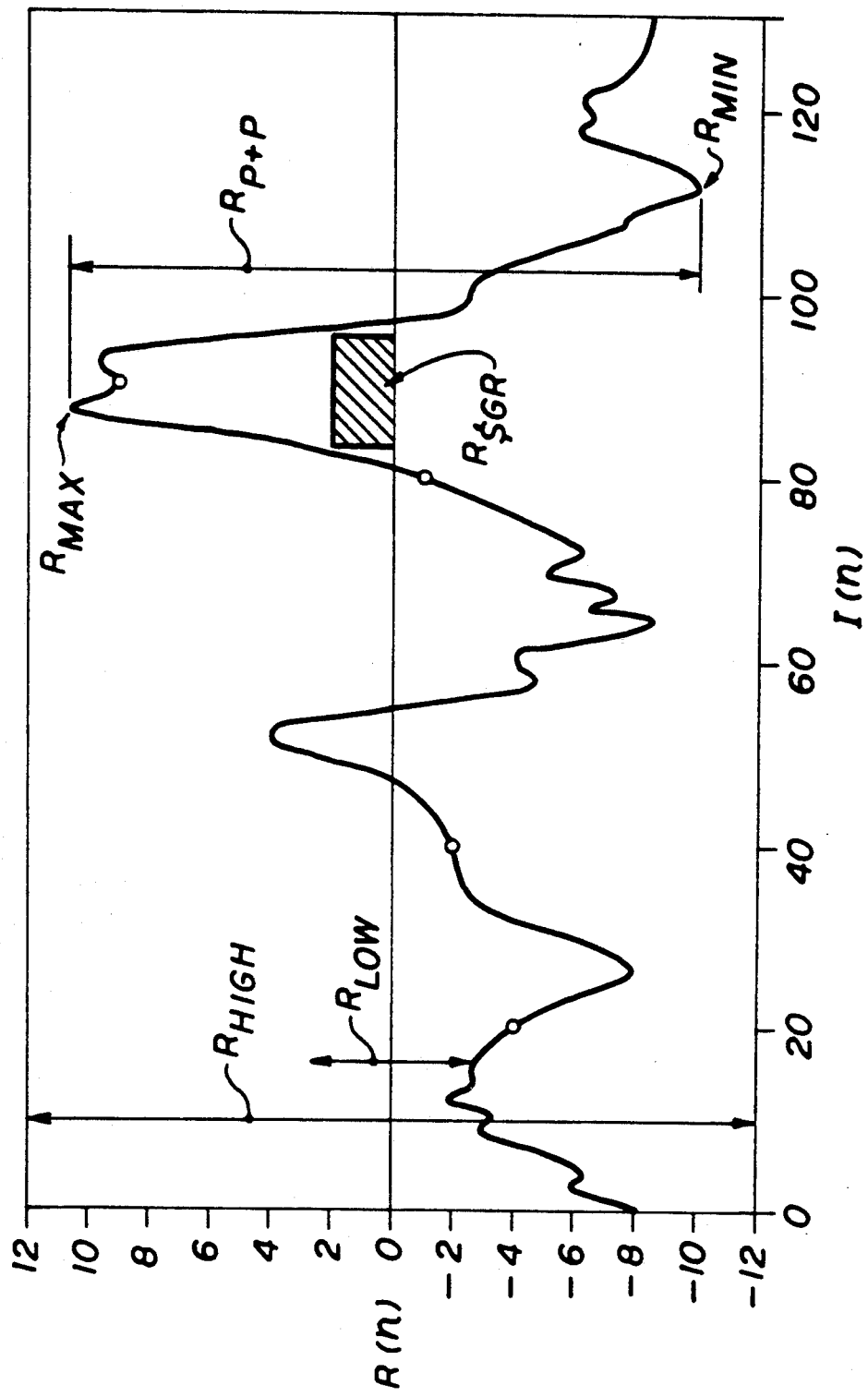
FIG. 4 is a graph of a radial force variation waveform for the tire, this graph also depicting a radial grind component which represents the amount and pattern of material removal necessary to correct excessive radial force variations in the tire.
Figure 5:
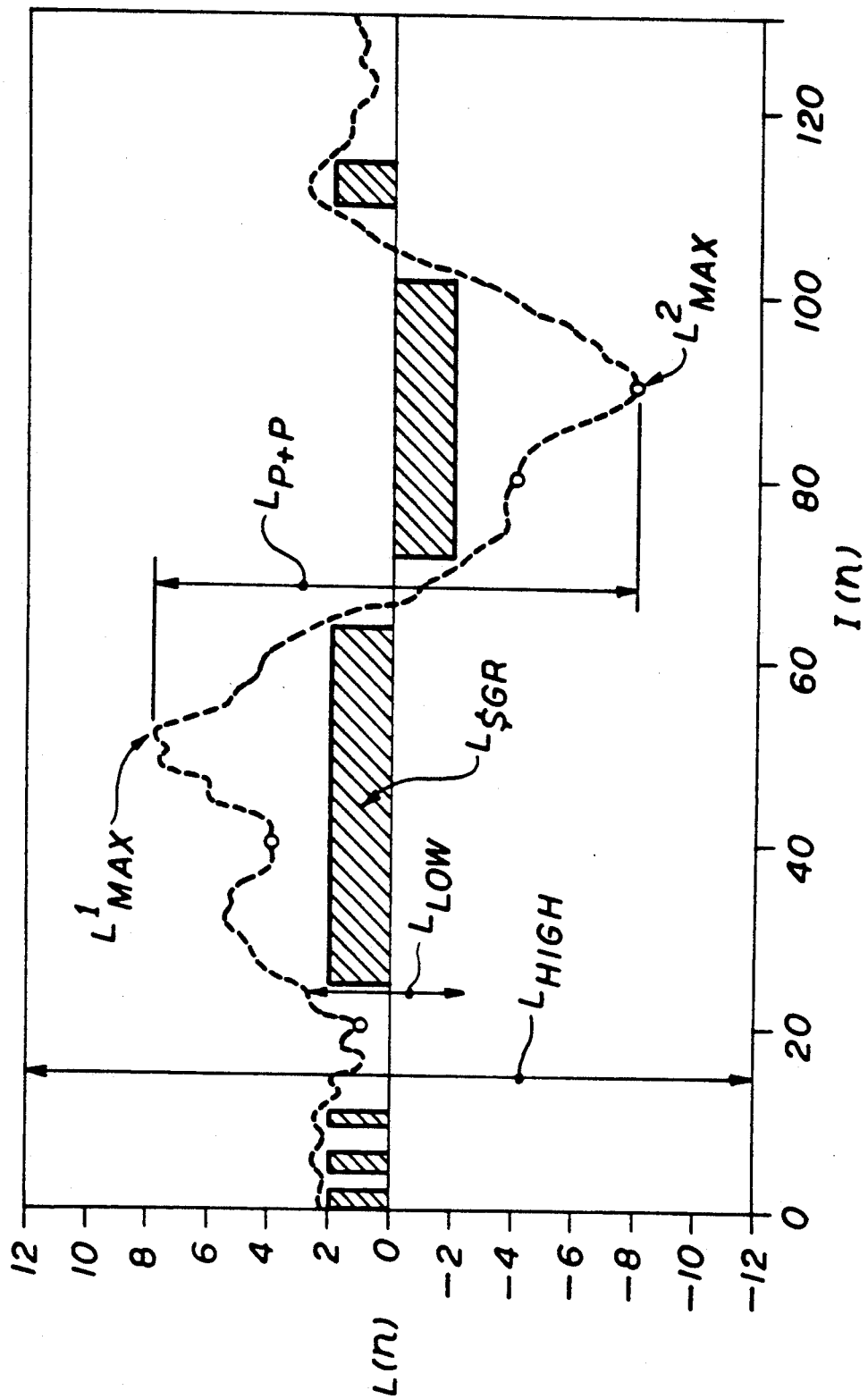
FIG. 5 is a graph of a lateral force variation waveform for the tire, this graph also depicting lateral grind components which represent the amount and pattern of material removal necessary to correct excessive lateral force variations in the tire.

For analytical purposes, it is often helpful to plot the force measurements against the increment identifiers to generate a "force variation waveform." FIG. 4 is a graph of the tire's radial force variation waveform words, a plot of the radial force measurements R(n)

against the increments I(n). FIG. 5 is a graph of the tire's lateral force variation waveform or, in other words, a plot of the lateral force measurements L(n) against the increments I(n). (It may be noted for future reference that FIG. 6 is a graph of the waveforms of FIGS. 4 and 5 superimposed upon each other.)

Figure 6:
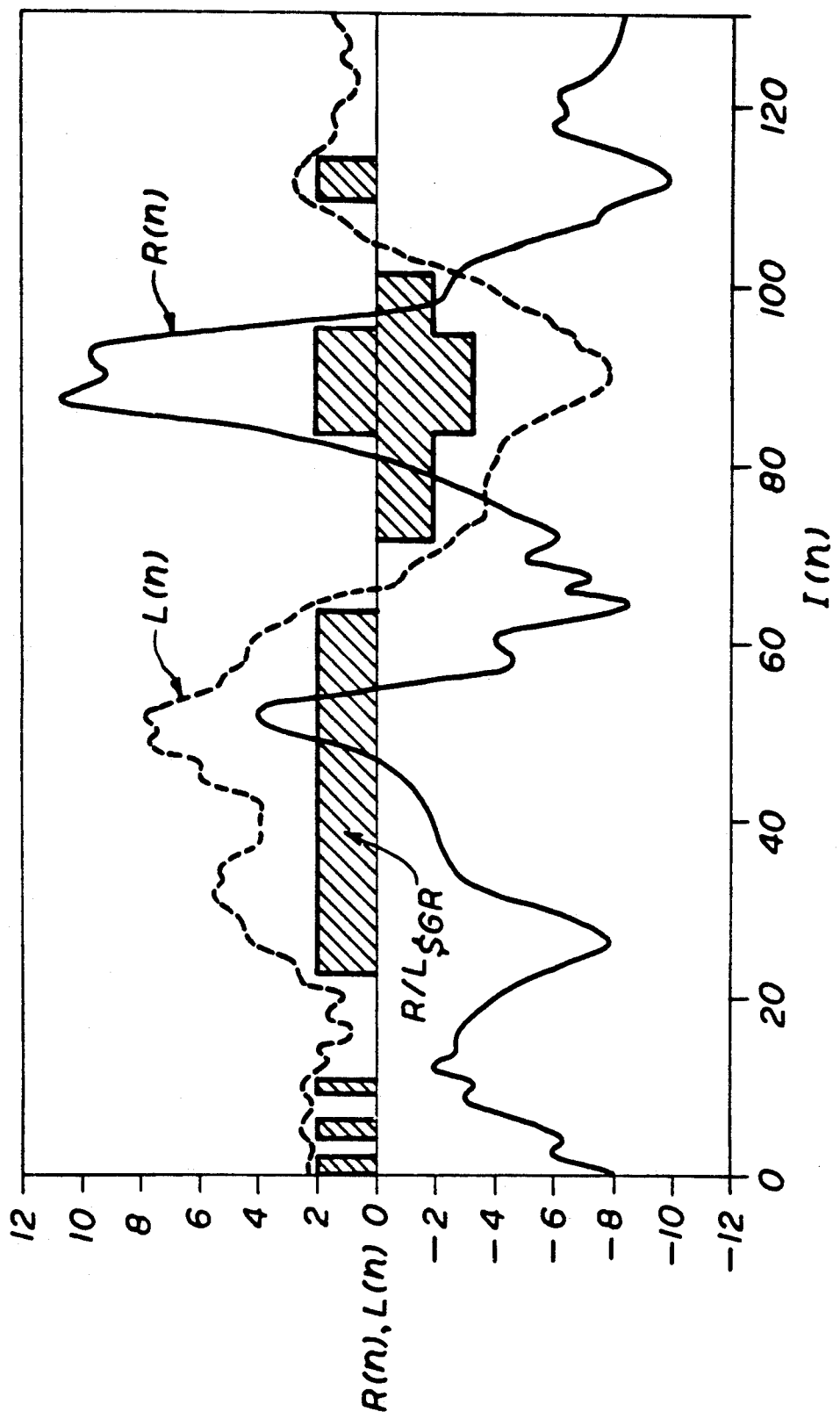
FIG. 6 is a graph of the waveforms of FIGS. 4 and 5 superimposed upon each other, this graph also depicting radial/lateral grind components which represent the amount and pattern of material removal necessary to simultaneously correct for excessive radial force variations and excessive lateral force variations in the tire.

In the illustrated example, the components of the waveform data array for the 20th, 40th, 80th, and 90th increments of the tire 10 (when the waveform data is plotted as shown in FIGS. 4, 5 and 6) is as follows:

$I(20)=20$, $R(20)=-4.0$, $L(20)=+1.0$;

$I(40)=40$, $R(40)=-2.0$, $L(40)=+4.0$;

$I(80)=80$, $R(80)=-0.5$, $L(80)=-4.0$;

and $I(90)=90$, $R(90)=+9.0$, $L(90)=-8.0$.

The succeeding steps of the correction method may be viewed as including a stage in which a radial grind component $R_{SGR}(n)$ is generated for each of the increments I(n) and a stage in which first and second lateral grind components $L^1_{SGR}(n)$ and $L^2_{SGR}(n)$ are generated for each of the increments I(n). The radial grind component $R_{SGR}(n)$ represents the amount of material removal from the tire tread 12(n) necessary to correct excessive radial force variations in the tire 10, the first lateral grind component $L^1_{SGR}(n)$ represents the amount of material removal from the first shoulder region $12^1(n)$ necessary to correct excessive lateral force variations in the tire 10, and the second lateral grind component $L^2_{SGR}(n)$ represents the amount of material removal from the second shoulder region $12^2(n)$ necessary to correct excessive lateral force variations in the tire 10. In the illustrated embodiment, the radial grind components $R_{SGR}(n)$ are generated in the process of generating a radial grind array (I(n), $R_{SGR}(n)$) and the lateral grind components $L^1_{SGR}(n)$ and $L^2_{SGR}(n)$ are generated in the process of generating a lateral grind array (I(n), $L^1_{SGR}(n)$, $L^2_{SGR}(n)$).

The grind components $R_{SGR}(n)$, $L^1_{SGR}(n)$ and $L^2_{SGR}(n)$ are then used to generate first and second radial/grind components $R/L^1_{SGR}(n)$ and $R/L^2_{SGR}(n)$ for each of the increments I(n). The first radial/lateral grind component $R/L^1_{SGR}(n)$ represents the amount of material removal from the first shoulder region $12^1(n)$ necessary to simultaneously correct excessive radial force variations and excessive lateral force variations in the tire 10; the second radial/lateral grind component $R/L^2_{SGR}(n)$ represents the amount of material removal from the second shoulder region $12^2(n)$ necessary to simultaneously correct excessive radial force variations and excessive lateral force variations in the tire 10. In the illustrated embodiment, the radial/lateral grind components $R/L^1_{SGR}(n)$ and $R/L^2_{SGR}(n)$ are generated in the process of generating a radial/lateral grind array (I(n), $R/L^1_{SGR}(n)$, and $R/L^2_{SGR}(n)$).

Material is then removed from the first shoulder region $12^1(n)$ of each increment I(n) according to the value of the corresponding first radial/lateral grind component $R/L^1_{SGR}(n)$ and material is removed from the second shoulder region $12^2(n)$ of each increment I(n) according to the Value of the corresponding second radial/lateral grind component $R/L^2_{SGR}(n)$. In the illustrated embodiment, this removal is accomplished by conveying the radial/lateral grind array (I(n), $R/L^1_{SGR}(n)$, and $R/L^2_{SGR}(n)$) to the grinders $34^1$ and $34^2$. (See FIG. 1.) In this manner, material is removed from the tire shoulders $12^1$ and $12^2$ in a pattern which simultaneously corrects for excessive radial force variations and excessive lateral force variations in the tire 10.

To generate the radial grind array (and thus the radial grind component $R_{SGR}$), the maximum value $R_{max}$ and the minimum value $R_{min}$ of the radial force measurements R(n) are first determined. A "peak-to-peak" value $R_{PtP}$, which represents the radial force variation range, is also calculated by computing the difference between the $R_{max}$ and $R_{min}$ values. In the radial force variation waveform shown in FIG. 4, the waveform is distributed about a zero reference representing the mean of the $R_{max}$ and $R_{min}$ points. In the illustrated example, $R_{max}$ is equal to positive 10 (+10), $R_{min}$ is equal to negative 10 (−10), and $R_{PtP}$ is equal to 20.

The $R_{PtP}$ value is then compared to a preset range $R_{low}$ which represents the upper limits of unnoticeable radial force variation. If the $R_{PtP}$ value is less than $R_{low}$, radial force variation corrections are not necessary because any existing radial force variation would not be noticeable when the tire 10 is installed on a vehicle. In such a situation, a default radial grind array (I(n), $R_{SGR}(n)$) is generated, in which the radial grind factor $R_{SGR}(n)$ is set to zero (0) for $n=1-N$, and the method progresses to the next stage.

Optionally and preferably, the $R_{PtP}$ value is also compared to a preset range $R_{high}$ which represents the lower limits of radial force variation not correctable by material removal techniques. If the $R_{PtP}$ value is greater than $R_{high}$, radial force variation corrections may not be possible, because, for instance, the amount of material removal necessary to make such corrections would exceed industry accepted limits. In such a situation, the tire 10 may be exempt from further force correction procedures and the method discontinued.

If the $R_{PtP}$ value falls between $R_{low}$ and $R_{high}$, as it does in the illustrated example, a radial grind boundary $R_{boundary}$ is calculated. Preferably, the grind boundary $R_{boundary}$ is dependent on the $R_{min}$ value and the $R_{PtP}$ value. More preferably, the grind boundary $R_{boundary}$ is the sum of the $R_{min}$ value and a fraction Rf of the $R_{PtP}$ value whereby $R_{boundary}$ is calculated as follows:

$$R_{boundary} = R_{min} + (Rf * R_{PtP})$$

Even more preferably, the fraction Rf is equal to 0.9 whereby $R_{boundary}$ is equal to 8.0 in the illustrated example. In any event, each value of R(n) is then compared to the radial grind boundary $R_{boundary}$ to generate the following Comparison array:

(I(n), $R_{comparison}(n)$)

wherein $$R_{comparison}(n) = (n) - R_{boundary}$$

In the illustrated example, the comparison array components for the 20th, 40th, 80th, and 90th increments are as follows:

$I(20)=20$, $R_{comparison}(20) = -4.0 - 8.0 = -12.0$ $I(40)=40$, $R_{comparison}(40) = -2.0 - 8.0 = -10.0$ $I(80)=80$, $R_{comparison}(80) = -0.5 - 8.0 = -8.5$ $I(90)=90, R_{comparison}(90)=+9.0-8.0=+1.0$ The comparison array $(I(n), R_{comparison}(n))$ is then used to generate the following radial grind array:

$(I(n), R_{SGR}(n))$ wherein $R_{SGR}(n)$ 0 if $R_{comparison} \leq 0$; and
$R_{SGR}(n)$ if $0 R_{comparison} > 0$.

In the preferred embodiment, the non-zero values of $R_{SGR}(n)$ are set equal to 3.0. Thus, in the illustrated example, the components of the radial grind array for the 20th, 40th, 80th, and 90th increments are as follows:

$I(20)=20, R_{comparison}(20) \leq 0 \therefore R_{SGR}(n)=0;$ $I(40)=40, R_{comparison}(40) \leq 0 \therefore R_{SGR}(n)=0;$ $I(80)=80, R_{comparison}(80) \leq 0 \therefore R_{SGR}(n)=0;$ and $I(90)=90, R_{comparison}(90) > 0 \therefore R_{SGR}(n)=3.0.$ This pattern reflects that radial force corrections would not be necessary for the 20th, 40th, and 80th increments of the tire 10, and that radial force corrections would be necessary for the 90th increment.

To generate the lateral grind array (and thus the lateral grind components $L^1_{SGR}(n)$ and $L^2_{SGR}(n)$), a maximum value $L^1_{max}$ in a first direction and a maximum value $L^2_{max}$ in a second direction of the lateral force measurements $L(n)$ are determined. A "peak-to-peak" value $L_{PtP}$, which represents the lateral force variation range, is also calculated by computing the difference between the $L^1_{max}$ and $L^2_{max}$ values. For clarity and consistency in explanation, the convention will be adopted that the first direction will be upward and the second direction will be downward. (It may be noted that an analogous convention is used in the referencing of the tire shoulders 12[1] and 12[2], the measuring devices 30[1] and 30[2], and the grinders 34[1] and 34[2].) In the lateral force variation waveform shown in FIG. 5, the waveform is distributed about a zero reference representing the mean of the $L^1_{max}$ and $L^2_{max}$ points. In this illustrated waveform, $L^1_{max}$ is equal to positive 8 (+8), $L^2_{max}$ is equal to negative 8 (−8), and $L_{PtP}$ is equal to 16.

The $L_{PtP}$ value is then compared to a preset range $L_{low}$ which represents the upper limits of unnoticeable lateral force variation. If the $L_{PtP}$ value is less than $L_{low}$, lateral force variation corrections are not necessary because any existing lateral force variation would not be noticeable when the tire 10 is installed on a vehicle. In such a situation, a default lateral grind array $(I(n), L^1_{SGR}(n), L^2_{SGR}(n))$ is generated in which the components $L^1_{SGR}(n)$ and $L^2_{SGR}(n)$ of the lateral grind array are set to zero (0) for $n=1-N$, and the method progresses to the next stage.

Optionally and preferably, the $L_{PtP}$ value is also compared to a preset range $L_{high}$ which represents the lower limits of lateral force variation not correctable by material removal techniques. If the $L_{PtP}$ value is greater than $L_{high}$, lateral force variation corrections may not be possible, because, for instance, the amount of material removal necessary to make such corrections would exceed industry accepted limits. In this event, the tire 10 may be exempt from further force correction procedures and the method discontinued.

If the $L_{PtP}$ value falls between $L_{low}$ and $L_{high}$, as it does in the illustrated example, a first lateral grind boundary $L^1_{boundary}$ and a second lateral grind boundary $L^2_{boundary}$ are calculated. Preferably, the lateral grind boundaries $L^1_{boundary}$ and $L^2_{boundary}$ are dependent on the first maximum value $L^1_{max}$ and the peak-to-peak $L_{PtP}$ value. More preferably, the first grind boundary $L^1_{boundary}$ is the difference between the $L^1_{max}$ value and a fraction $Lf^1$ of the $L_{PtP}$ value and the second grind boundary $L^2_{boundary}$ is the difference between the $L^1_{max}$ value and a fraction $Lf^2$ of the $L_{PtP}$ value. Thus, the lateral grind boundaries are calculated as follows:

$$L^1_{boundary} = L^1_{max} - (Lf^1 * L_{PtP});$$

and $$L^2_{boundary} = L^1_{max} - (Lf_2 * L_{PtP}).$$

Even more preferably, the fraction $Lf^1$ is equal to approximately 0.375 and the fraction $Lf^2$ is equal to approximately 0.625. These preferred values are adopted in the illustrated example whereby the $L^1_{boundary}$ is equal to positive 2 (+2) and the $L^2$ boundary is equal to negative 2 (−2).

Each value of $L(n)$ is then compared to the grind boundaries $L^1_{boundary}$ and $L^2_{boundary}$ to generate the following comparison array:

$(I(n), L^1_{comparison}(n), L^2_{comparison}(n))$ wherein $$L^1_{comparison}(n) = L(n) - L^1_{boundary};$$

and $$L^2_{comparison}(n) = L(n) - L^2_{boundary}.$$

In the illustrated example, the comparison array components of the 20th, 40th, 80th, and 90th increments are as follows:

$I(20)=20, L^1_{comparison}(20)=+1.0-2.0=-1.0$ $I(40)=40, L^1_{comparison}(40)=-4.0-2.0=+2.0$ $I(80)=80, L^1_{comparison}(80)=-4.0-2.0=-6.0$ $I(90)=90, L^1_{comparison}(90)=-8.0-2.0=-10.0$ $I(20)=20, L^2_{comparison}(20)=+1.0--2.0=+3.0$ $I(40)=40, L^2_{comparison}(40)=+4.0--2.0=+6.0$ $I(80)=80, L^2_{comparison}(80)=-4.0--2.0=-2.0.$ $I(90)=90, L^2_{comparison}(90)=-8.0--2.0=-6.0$ The comparison array $(I(n), L^1_{comparison}(n), L^2_{comparison}(n))$ is then used to generate the following lateral grind array:

$(I(n), L^1_{SGR}(n), L^2_{SGR}(n))$ wherein $L^1_{SGR}(n)=0$ if $L^1_{comparison} \leq 0;$ $L^1_{SGR}(n)>0$ if $L^1_{comparison} > 0;$ $L^2_{SGR}(n)=0$ if $L^2_{comparison} \geq 0$;

and $L^2_{SGR}(n)<0$ if $L^2_{comparison}<0$.

In the illustrated example, the non-zero values of $L^1_{SGR}(n)$ and $L^2_{SGS}(n)$ are set equal to 2 and $-2$, respectively. Thus, the lateral grind array components for the 20th, 40th, 80th, and 90th increments are as follows:

$I(20)=20, L^1_{comparison}(20) \leq 0 \rightarrow L^1_{SGR}=0$ $I(40)=40, L^1_{comparison}(40) > 0 \rightarrow L^1_{SGR}= +2.0$.

$I(80)=80, L^1_{comparison}(80) \leq 0 \rightarrow L^1_{SGR}=0$ $I(90)=90, L^1_{comparison}(90) \leq 0 \rightarrow L^1_{SGR}=0$ $I(20)=20, L^2_{comparison}(20) \leq 0 \rightarrow L^2_{SGR}=0$ $I(40)=40, L^2_{comparison}(40) \leq 0 \rightarrow L^2_{SGR}= -0$ $I(80)=80, L^2_{comparison}(80) < 0 \rightarrow L^2_{SGR}= -2.0$ $I(90)=90, L^2_{comparison}(90) < 0 \rightarrow L^2_{SGR}= -2.0$ This pattern reflects that lateral force corrections would be necessary for the 40th, 80th, and 90th increments, and would not be necessary for the 20th increment. This pattern also reflects that the lateral force corrections for the 40th increment would be made with the first grinder $34^1$ and the lateral force corrections for the 80th and 90th increments would be made with the second grinder $34^2$.

The radial grind components $R_{SGR}(n)$ and the lateral grind components $L^1_{SGR}(n)$ and $L^2_{SGR}(n)$ are then used to generate the radial/lateral grind array (and thus the radial/lateral grind components $R/L^1_{SGR}(n)$ and $R/L^2_{SGR}(n)$). Preferably, the following multiplier array is first generated:

$(I(n), R/L_{multiplier}(n))$ wherein:

$R/L_{multiplier}(n) = R/Lf$ if $R_{SGR} \neq 0$ and $L^1_{SGR} \neq 0$ or $R_{SGR} \neq 0$ and $L^2_{SGR} \neq 0$; and $R/L_{multiplier}(n) = 1.0$ if $R_{SGR} = 0$ or $L^1_{SGR} = 0$ and $R_{SGR} = 0$ or $L^2_{SGR} = 0$.

Thus, the grind factors $R_{SGR}(n)$, $L^1_{SGR}(n)$, and $L^2_{SGR}(n)$ are used to set the value of the radial/lateral multiplier $R/L_{multiplier}(n)$. Specifically, if both radial and lateral force corrections are necessary for a particular increment $I(n)$ (or, in other words, if the corresponding radial grind component $R_{SGR}(n)$ is a non-zero value and either of the corresponding lateral grind components $L^1_{SGR}(n)$ or $L^2_{SGR}(n)$ is a non-zero value), the radial/lateral multiplier $R/L_{multiplier}(n)$ is set at a fractional value $R/Lf$. If only radial force corrections, or only lateral force corrections, are necessary for a particular increment $I(n)$ (or, in other words, if the corresponding radial grind component $R_{SGR}(n)$ is set at a zero value or both of the corresponding lateral grind components $L^1_{SGR}(n)$ or $L^2_{SGR}(n)$ are set at zero values), the radial/lateral multiplier $R/L_{multiplier}(n)$ is set equal to a default value of 1.0.

Preferably, the fractional value $R/Lf$ is between 0.3 and 0.7, and even more preferably, the fractional value $R/Lf$ is approximately equal to 0.5. If the preferred value of $R/Lf$ is adopted with the illustrated example, the components for the 20th, 40th, 80th, and multiplier array components for the 20th, 40th, 80th, and 90th increments are as follows:

$I(20)=20,$
$\quad R_{SGR}(20)=0,$
$\quad L^1_{SGR}(20)=0,$
$\quad L^2_{SGR}(20)=0,$
$\quad \therefore R/L_{multiplier}(20)\ 1.0$
$I(40)=40,$
$\quad R_{SGR}(40)=0,$
$\quad L^1_{SGR}(40)= +2.0 \neq 0,$
$\quad L^2_{SGR}(40)=0,$
$\quad \therefore R/L_{multiplier}(40)=1.0$
$I(80)=80,$
$\quad R_{SGR}(80)=0,$
$\quad L^1_{SGR}(80)=0,$
$\quad L^2_{SGR}(80)= -2.0 \neq 0,$
$\quad \therefore R/L_{multiplier}(80)=1.0$
$I(90)=90,$
$\quad R_{SGR}(90)= +3.0 \neq 0,$
$\quad L^1_{SGR}(90)=0$
$\quad L^2_{SGR}(90)= -2.0 \neq 0,$
$\quad \therefore R/L_{multiplier}(90)=0.5$ The grind components $R_{SGR}(n)$, $L^1_{SGR}(n)$, $L^2_{SGR}(n)$, and the multiplier $R/L_{multiplier}(n)$ are then used to calculate the following radial/lateral grind array:

$(I(n), R/L^1_{SGR}(n), R/L^2_{SGR}(n))$ wherein $R/L^1_{SGR}(n) = R/L_{multiplier}(n) *$
$\quad (R_{SGR}(n)+L^1_{SGR}(n));$ and $R/L_{2SGR}(n) = R/L_{multiplier}(n) *$
$\quad (-R_{SGR}(n)+L^2_{SGR}(n)).$ This radial/lateral grind array is then conveyed to the grinders $34^1$ and $34^2$ to remove material from the tire shoulders $12^1$ and $12^2$ in a pattern which simultaneously corrects for excessive radial force variations and excessive lateral force variations.

In the illustrated example, the radial/lateral grind array components for the 20th, 40th, 80th, and 90th increments are as follows:

$I(20) = 20,$
$R/L^1_{SGR}(20) = R/L_{multiplier}(20) * (\ R_{SGR}(20) + L^1_{SGR}(20))$
$\qquad = 1.0 \qquad\qquad * \ (\ 0+0)$
$\qquad = 0$
$R/L^2_{SGR}(20) = R/L_{multiplier}(20) * (-R_{SGR}(20) + L^2_{SGR}(n))$
$\qquad = 1.0 \qquad\qquad * \ (\ 0+0)$
$\qquad = 0$ $I(40) = 40,$ -continued $$R/L^1_{SGR}(40) = R/L_{multiplier}(40) * (\ R_{SGR}(40) + L^1_{SGR}(40))$$
$$= 1.0 \quad * \quad (\ 0 + +2.0)$$
$$= 2.0$$
$$R/L^2_{SGR}(40) = R/L_{multiplier}(40) * (-R_{SGR}(40) + L^2_{SGR}(n))$$
$$= 1.0 \quad * \quad (\ 0 + 0)$$
$$= 0$$

$I(80) = 80,$ $$R/L^1_{SGR}(80) = R/L_{multiplier}(80) * (\ R_{SGR}(80) + L^1_{SGR}(80))$$
$$= 1.0 \quad * \quad (\ 0 + 0)$$
$$= 0$$
$$R/L^2_{SGR}(80) = R/L_{multiplier}(80) * (-R_{SGR}(80) + L^2_{SGR}(n))$$
$$= 1.0 \quad * \quad (\ 0 + -2.0)$$
$$= -2.0$$

$I(90) = 90,$ $$R/L^1_{SGR}(90) = R/L_{multiplier}(90) * (\ R_{SGR}(90) + L^1_{SGR}(90))$$
$$= 0.5 \quad * \quad (\ 3.0 + 0)$$
$$= 1.5$$
$$R/L^2_{SGR}(90) = R/L_{multiplier}(90) * (-R_{SGR}(90) + L^2_{SGR}(n))$$
$$= 0.5 \quad * \quad (-3.0 + -2.0)$$
$$= -2.5$$

This pattern reflects that, when these values are conveyed to the grinders $34^1$ and $34^2$, neither grinder would be activated for the 20th increment because neither radial force corrections nor lateral force corrections would be necessary. For the 40th increment, only the first grinder $34^1$ would be activated at a heaviness setting corresponding to the 2.0 value of $R/L^1_{SGR}(40)$ because only lateral force corrections are necessary. For the 80th increment, the second grinder $34^2$ would be activated at a heaviness setting corresponding to the $-2.0$ value of $R/L^2_{SGR}(80)$ because only lateral force corrections are necessary. For the 90th increment, both radial force and lateral force corrections are necessary, and both the grinders $34^1$ and $34^2$ would be activated. Specifically, the first grinder $34^1$ is activated at a heaviness setting corresponding to the 1.5 value of $R/L^1_{SGR}(90)$ and the second grinder $34^2$ is activated at a heaviness setting corresponding to the $-2.5$ value of $R/L^2_{SGR}(90)$.

One may now appreciate that the present invention provides a method which simultaneously, accurately, and efficiently, corrects for excessive radial force variations and excessive lateral force variations. Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A method for simultaneously correcting excessive radial force variations and excessive lateral force variations in a pneumatic tire having a circumferential tire tread with first and second shoulders, said method comprising the steps of:

indexing the tire tread into a series of circumferential increments $I(n)$ each of which includes a first shoulder region and a second shoulder region;

obtaining a series of radial force measurements $R(n)$ corresponding to the series of circumferential increments $I(n)$ of the tire tread;

generating, for each of the increments $I(n)$, a radial grind component $R_{SGR}(n)$ which represents the amount of material removal from the corresponding increment $I(n)$ necessary to correct excessive radial force variations in the tire;

obtaining a series of lateral force measurements $L(n)$ corresponding to the series of circumferential increments $I(n)$ of the tire tread;

generating, for each of the increments $I(n)$, a first lateral grind component $L^1_{SGR}(n)$ which represents the amount of material removal from the first shoulder region of the corresponding increment $I(n)$ necessary to correct excessive lateral force variations in the tire, and a second lateral grind component $L^2_{SGR}(n)$ which represents the amount of material removal from the second shoulder region of the corresponding increment $I(n)$ necessary to correct excessive lateral force variations in the tire;

generating from the grind components $R_{SGR}(n)$, $L^1_{SGR}(n)$, and $L^2_{SGR}(n)$ for each of the increments $I(n)$, a first radial/lateral grind component $R/L^1_{SGR}(n)$ which represents the amount of material removal from the first shoulder region of the corresponding increment $I(n)$ necessary to simultaneously correct excessive radial force variations and excessive lateral force variations in the tire, and a second radial/lateral grind component $R/L^2_{SGR}(n)$ which represents the amount of material removal on the second shoulder region of the corresponding increment $I(n)$ necessary to simultaneously correct excessive radial and lateral force variations in the tire;

removing material from the first shoulder region of each increment $I(n)$ according to the value of the corresponding first radial/lateral grind component $R/L^1_{SGR}(n)$; and removing material from the second shoulder region of each increment $I(n)$ according to the value of the corresponding second radial/lateral grind component $R/L^2_{SGR}(n)$.

2. The method of claim 1 wherein said removing steps comprise the steps of:

providing a first grinder adapted to move in and out of cutting engagement with the first shoulder;

providing a second grinder adapted to move in and out of cutting engagement with the second shoulder independent of the first grinder;

controlling the first grinder in relation to the value of the first radial/lateral grind component $R/L^1_{SGR}(n)$; and controlling the second grinder in relation to the value of the second radial/lateral grind component $R/L^2_{SGR}(n)$.

3. The method of claim wherein said step of generating the first radial/lateral grind component $R/L^1_{SGR}(n)$ includes the step of adding the corresponding radial grind component $R_{SGR}(n)$ and the corresponding first lateral grind component $L^1_{SGR}(n)$; and wherein said step of generating the second radial/lateral grind component $R/L^2_{SGR}(n)$ includes the step of adding the negative of the corresponding radial grind component $R_{SGR}(n)$ and the corresponding second lateral grind component $L^1_{SGR}(n)$.

4. The method of claim 3 wherein said step of generating the first and second radial/lateral grind components $R/L^1_{SGR}(n)$ and $R/L^2_{SGR}(n)$ further includes the steps of:

generating, for each increment I(n), a radial/lateral multiplier $R/L_{multiplier}(n)$;

multiplying, for each increment I(n), the sum of the radial grind component $R_{SGR}(n)$ and the first lateral grind component $L^1_{SR}(n)$ by the corresponding radial/lateral multiplier $R/L_{multiplier}(n)$; and multiplying, for each increment I(n), the sum of the negative of the radial grind component $R_{SGR}(n)$ and the second lateral grind component $L^2_{SGR}(n)$ by the corresponding radial/lateral multiplier $R/L_{multiplier}(n)$.

5. The method of claim 4 wherein said step of generating the radial/lateral multiplier $R/L_{multiplier}(n)$ includes the steps of:

setting, for each increment I(n), the radial/lateral multiplier $R/L_{multiplier}(n)$ equal to a fractional value R/Lf if the corresponding radial grind component $R_{SGR}(n)$ is a non-zero value and either of the corresponding lateral grind components $L^1_{SGR}(n)$ or $L^2_{SGR}(n)$ is a non-zero value; and setting, for each increment I(n), the radial/lateral multiplier $R/L_{multiplier}(n)$ equal to a default value of 1.0 if the corresponding radial grind component $R_{SGR}(n)$ is set at a zero value or both of the corresponding lateral grind components $L^1_{SGR}(n)$ and $L^2_{SGR}(n)$ are set at zero values.

6. The method of claim 5 wherein said step of setting the radial/lateral multiplier $R/L_{multiplier}(n)$ equal to a fractional value R/Lf comprises the step of setting the radial/lateral multiplier $R/L_{multiplier}(n)$ to a fractional value between 0.3 and 0.7.

7. The method of claim 6 wherein said step of setting the radial/lateral multiplier $R/L_{multiplier}(n)$ equal to a fractional value R/Lf comprises the step of setting the radial/lateral multiplier $R/L_{multiplier}(n)$ to a fractional value approximately equal to 0.5.

8. The method of any of claims 1–7 wherein said step of generating a radial grind component $R_{SGR}(n)$ comprises the steps of:

determining a maximum value $R_{max}$ and a minimum value $R_{min}$ of the radial force measurements R(n);

calculating a peak-to-peak value $R_{PtP}$ which represents the difference between $R_{max}$ and $R_{min}$;

calculating a radial grind boundary $R_{boundary}$;

generating, for each increment I(n), a radial comparison component $R_{comparison}(n)$ based on a comparison between the radial grind boundary $R_{boundary}$ and the corresponding radial force measurements R(n); and using, for each increment I(n), the radial comparison component $R_{comparison}(n)$ to generate the corresponding radial grind component $R_{SGR}(n)$.

9. The method of claim 1 wherein said step of generating a radial grind component $R_{SGR}(n)$ comprises the steps of:

determining a maximum value $R_{max}$ and a minimum value $R_{min}$ of the radial force measurements R(n);

calculating a peak-to-peak value $R_{PtP}$ which represents the difference between $R_{max}$ and $R_{min}$;

calculating a radial grind boundary $R_{boundary}$ dependent on the minimum value $R_{min}$ and the peak-to-peak value $R_{PtP}$;

generating, for each increment I(n), a radial comparison component $R_{comparison}(n)$ based on a comparison between the radial grind boundary $R_{boundary}$ and the corresponding radial force measurements R(n); and using, for each increment I(n), the radial comparison component $R_{comparison}(n)$ to generate the corresponding radial grind component $R_{SGR}(n)$.

10. The method of claim 9 wherein said step of calculating a radial grind boundary $R_{boundary}$ includes the step of adding the minimum value $R_{min}$ to a fraction of the peak-to-peak value $R_{PTP}$.

11. The method of claim 10 wherein said step of generating a radial comparison component $R_{comparison}(n)$ includes the step of calculating, for each increment I(n), the difference between the radial force measurement R(n) and the radial grind boundary $R_{boundary}$.

12. The method of claim 11 wherein said step of using the radial comparison component $R_{comparison}(n)$ to generate the corresponding radial grind component $R_{SGR}(n)$ comprises the steps of:

setting, for each increment I(n), the radial grind component $R_{SGR}(n)$ equal to zero if the corresponding radial comparison component $R_{comparison}(n)$ is less than or equal to zero; and setting, for each increment I(n), the radial grind component $R_{SGR}(n)$ equal to a non-zero value if the corresponding radial comparison component $R_{comparison}(n)$ is greater than zero.

13. The method of claim 12 wherein said step of generating a first lateral grind component $L^1_{SGR}(n)$ and a second lateral grind component $L^2_{SGR}(n)$ comprises the steps of:

determining a maximum value $L^1_{max}$ of the lateral force measurements L(n) in a first direction and a maximum value $L^2_{max}$ of the lateral force measurements L(n) in a second direction;

calculating a peak-to-peak value $L_{PtP}$ which represents the difference between $L^1_{max}$ and $L^2_{max}$;

calculating a first lateral grind boundary $L^1_{boundary}$;

generating, for each increment I(n), a first lateral comparison component $L^1_{comparison}(n)$ based on a comparison between the first lateral grind boundary $L^1_{boundary}$ and the corresponding lateral force measurements L(n);

using, for each increment I(n), the first lateral comparison component $L^1_{comparison}(n)$ to generate the corresponding first lateral grind component $L_{SGR}(n)$;

calculating a second lateral grind boundary $L^2_{boundary}$;

generating, for each increment I(n), a second lateral comparison component $L^2_{comparison}(n)$ based on a comparison between the second lateral grind boundary $L^2_{boundary}$ and the corresponding lateral force measurements L(n); and using, for each increment I(n), the second lateral comparison component $L^2_{comparison}(n)$ to generate the corresponding second lateral grind component $L^2_{SGR}(n)$.

14. The method of claim 13 wherein said step of calculating a first lateral grind boundary $^1_{boundary}$ includes the step of calculating a first lateral grind boundary $L^1_{boundary}$ dependent on the first maximum value $L^1_{max}$ and the peak-to-peak value $L_{PtP}$, and wherein said step of calculating a second lateral grind boundary $L^1_{boundary}$ includes the step of calculating a first lateral grind boundary $L^1_{boundary}$ dependent on the first maximum value $L^1_{max}$ and the peak-to-peak value $L_{PtP}$.

15. The method of claim 14 wherein said step of calculating a first lateral grind boundary $L^1_{boundary}$ includes the step of adding the first maximum value $L^1_{max}$ to a fraction of the peak-to-peak value $L_{PtP}$, and wherein said step of calculating a second lateral grind boundary $L^2_{boundary}$ includes the step of adding the first maximum value $L^1_{max}$ to a fraction of the peak-to-peak value $L_{PtP}$.

16. The method of claim 15 wherein said step of adding the first maximum value $L^1_{max}$ to a fraction of the peak-to-peak value $L_{PtP}$ to calculate the first lateral grind boundary $L^1_{boundary}$ includes the step of adding the first maximum value $L^1_{max}$ to 0.375 of the peak-to-peak value $L_{PtP}$; and wherein said step of adding the first maximum value $L^1_{max}$ to a fraction of the peak-to-peak value $L_{PtP}$ to calculate the second lateral grind boundary $L^2_{boundary}$ includes the step of adding the first maximum value $L^1_{max}$ to 0.625 of the peak-to-peak value $L_{PtP}$.

17. The method of claim 16 wherein said step of generating a first lateral comparison component $L^1_{comparison}(n)$ includes the step of calculating, for each increment $I(n)$, the difference between the lateral force measurement $L(n)$ and the first lateral grind boundary $L^1_{boundary}$; and wherein said step of generating a second lateral comparison component $L^2_{comparison}(n)$ includes the step of calculating, for each increment $I(n)$, the difference between the lateral force measurement $L(n)$ and the second lateral grind boundary $L^2_{boundary}$.

18. The method of claim 17 wherein:
said step of using the first comparison component $L^1_{comparison}(n)$ to generate the corresponding lateral grind component $L^1_{sGR}(n)$ comprises the steps Of:
setting, for each increment $I(n)$, the first lateral grind component $L^1_{sGR}(n)$ equal to zero if the corresponding first lateral comparison component $L^1_{comparison}(n)$ is less than or equal to zero, and
setting, for each increment $I(n)$, the first lateral grind component $L^1_{sGR}(n)$ equal to a non-zero value if the corresponding first lateral comparison component $L^1_{comparison}(n)$ is greater than zero; and
said step of using the second comparison component $L^2_{comparison}(n)$ to generate the corresponding second lateral grind component $L^2_{sGR}(n)$ comprises the steps of:
setting, for each increment $I(n)$, the second lateral grind component $L^2_{sGR}(n)$ equal to zero if the corresponding second lateral comparison component $L^2_{comparison}(n)$ is greater than or equal to zero, and
setting, for each increment $I(n)$, the second lateral grind component $L_{2sGR}(n)$ equal to a non-zero value if the corresponding second lateral comparison component $L^2_{comparison}(n)$ is less than zero.

19. The method of any claims 17 wherein said step of generating a first lateral grind component $L^1_{sGR}(n)$ and a second lateral grind component $L^2_{sGR}(n)$ comprises the steps of:
determining a maximum value $L^1_{max}$ of the lateral force measurements $L(n)$ in a first direction and a maximum value $L^2_{max}$ of the lateral force measurements $L(n)$ in a second direction;
calculating a peak-to-peak value $L_{PtP}$ which represents the difference between $L^1_{max}$ and $L^2_{max}$;
calculating a first lateral grind boundary $L^1_{boundary}$;
generating, for each increment $I(n)$, a first lateral comparison component $L^1_{comparison}(n)$ based on a comparison between the first lateral grind boundary $L^1_{boundary}$ and the corresponding lateral force measurements $L(n)$;
using, for each increment $I(n)$, the first lateral comparison component $L^1_{comparison}(n)$ to generate the corresponding first lateral grind component $L^1_{sGR}(n)$;
calculating a second lateral grind boundary $L^2_{boundary}$;
generating, for each increment $I(n)$, a second lateral comparison component $L^2_{comparison}(n)$ based on a comparison between the second lateral grind boundary $L^2_{boundary}$ and the corresponding lateral force measurements $L(n)$; and
using, for each increment $I(n)$, the second lateral comparison component $L^2_{comparison}(n)$ to generate and corresponding second lateral grind component $L^2_{sGR}(n)$.

20. The method of claim 1 wherein said step of generating a first lateral grind component $L^1_{sGR}(n)$ and a second lateral grind component $L^2_{sGR}(n)$ comprises the steps of:
determining a maximum value $L^1_{max}$ of the lateral force measurement $L(n)$ in a first direction and a maximum value $L^2_{max}$ of the lateral force measurements $L(n)$ in a second direction;
calculating a peak-to-peak value $L_{PtP}$ which represents the difference between $L^1_{max}$ and $L^2_{max}$;
calculating a first lateral grind boundary $L^1_{boundary}$ dependent on the first maximum value $L^1_{max}$ and the peak-to-peak value $L_{PtP}$;
generating, for each increment $I(n)$, a first lateral comparison component $L^1_{comparison}(n)$ based on a comparison between the first lateral grind boundary $L^1_{boundary}$ and the corresponding lateral force measurement $L(n)$;
using, for each increment $I(n)$, the first lateral comparison component $L^1_{comparison}(n)$ to generate the corresponding first lateral grind component $L^1_{sGR}(n)$;
calculating a second lateral grind boundary $L^1_{boundary}$ includes the step of calculating a first lateral grind boundary $L^1_{boundary}$ dependent on the first maximum value $L^1_{max}$ and the peak-to-peak value $L_{PtP}$;
generating, for each increment $I(n)$, a second lateral comparison component $L^2_{comparison}(n)$ based on a comparison between the second lateral grind boundary $L^2_{boundary}$ and the corresponding lateral force measurements $L(n)$; and
using, for each increment $I(n)$, the second lateral comparison component $L^2_{comparison}(n)$ to generate the corresponding second lateral grind component $L^2_{sGR}(n)$.

21. The method of claim 20 wherein said step of calculating a first lateral grind boundary $L^1_{boundary}$ includes the step of adding the first maximum value $L^1_{max}$ to a fraction of the peak-to-peak value $L_{PtP}$; and wherein said step of calculating a second lateral grind boundary $L^2_{boundary}$ includes the step of adding the first maximum value $L^1_{max}$ to a fraction of the peak-to-peak value $L_{PtP}$.

22. The method of claim 21 wherein said step of adding the first maximum value $L^1_{max}$ to a fraction of the peak-to-peak value $L_{PtP}$ to calculate the first lateral grind boundary $L^1_{boundary}$ includes the step of adding the first maximum value $L^1_{max}$ to 0.375 of the peak-to-peak value $L_{PtP}$; and wherein said step of adding the first maximum value $L^1_{max}$ to a fraction of the peak-topeak value $L_{PtP}$ to calculate the second lateral grind boundary $L^2_{boundary}$ includes the step of adding the first maximum value $L^1_{max}$ to 0.625 of the peak-to-peak Value $L_{PtP}$.

23. The method of claim 22 wherein said step of generating a first lateral comparison component $L^1_{comparison}(n)$ includes the step of calculating, for each increment $I(n)$, the difference between the lateral force measurement $L(n)$ and the first lateral grind boundary $L^1_{boundary}$; and wherein said step of generating a second lateral comparison component $L^2_{comparison}(n)$ includes the step of calculating, for each increment $I(n)$, the difference between the lateral force measurement $L(n)$ and the second lateral grind boundary $L^2_{boundary}$.

24. The method of claim 23 Wherein:
said step of using the first comparison component $L^1_{comparison}(n)$ to generate the corresponding lateral grind component $L^1_{SGR}(n)$ comprises the steps of:
setting, for each increment $I(n)$, the first lateral grind component $L^1_{SGR}(n)$ equal to zero if the corresponding first lateral comparison component $L^1_{comparison}(n)$ is less than or equal to zero, and
setting, for each increment $I(n)$, the first lateral grind component $L^1_{SGR}(n)$ equal to a non-zero value if the corresponding first lateral comparison component $L^1_{comparison}(n)$ is greater than zero; and
said step of using the second comparison component $L^2_{comparison}(n)$ to generate the corresponding second lateral component $L^2_{SGR}(n)$ comprises the steps of:
setting, for each increment $I(n)$, second lateral grind component $L^2_{SGR}(n)$ equal to zero if the corresponding second lateral comparison component $L^2_{comparison}(n)$ is greater than or equal to zero, and
setting, for each increment $I(n)$, the second lateral grind component $L^2_{SGR}(n)$ equal to a non-zero value if the corresponding second lateral comparison component $L^2_{comparison}(n)$ is less than zero.

25. A method for simultaneously correcting excessive radial force variations and excessive lateral force variations in a pneumatic tire having a circumferential tire tread with first and second shoulders, said method comprising the steps of:
providing a tire uniformity machine including a freely rotating loading drum, an assembly which rotates the tire against the loading drum, measurement devices which measure the radial force and the lateral force exerted by the tire as it rotates against the loading drum, grinders which are adapted to move independently into and out of cutting engagement with the tire tread shoulders, and a computer which interprets the measurements and which controls the grinders;
indexing the tire tread into a series of circumferential increments $I(n)$ each of which includes a first shoulder region and a second shoulder region;
using the measuring devices to obtain a series of radial force measurements $R(n)$ corresponding tothe series of circumferential increments of the tire tread and to obtain a series of lateral force measurements $L(n)$ corresponding tothe series of circumferential increments of the tire tread;
conveying the force measurements $R(n)$ and $L(n)$ tothe computer; and
programming the computer to:
generate, for each of the increments $I(n)$, a radial grind component $R_{SGR}(n)$ which represents the amount of material removal from the corresponding increment $I(n)$ necessary to correct excessive radial force variations in the tire;
generate, for each of the increment $I(n)$, a first lateral grind component $L^1_{SGR}(n)$ which represents the amount of material removal from the first shoulder region of the corresponding increment $I(n)$ necessary to correct excessive lateral force variations in the tire, and a second lateral grind component $L^2_{SGR}(n)$ which represents the amount of material removal from the second shoulder region of the corresponding increment $I(n)$ necessary to correct excessive lateral force variations in the tire;
generating from the grind component $R_{SGR}(n)$, $L^1_{SGR}(n)$, and $L^2_{SGR}(n)$, for each of the increments $I(n)$, a first radial/lateral grind component $R/L^2_{SGR}(n)$ which represents the amount of material removal from the first shoulder region of the corresponding increment $I(n)$ necessary to simultaneously correct excessive radial force variations and a second radial/lateral grind component $R/L^2_{SGR}(n)$ which represents the amount of material removal on the second shoulder region of the corresponding increment $I(n)$ necessary to simultaneously correct excessive radial and lateral force variations in the tire;
control the first grinder to remove material from the first shoulder region of each increment $I(n)$ according to the value of the corresponding first radial/lateral grind component $R/L^1_{SGR}(n)$; and
control the second grinder to remove material from the second shoulder region of each increment according to the value of the corresponding second radial/lateral grind component $R/L^2_{SGR}(n)$.

26. A method for simultaneously correcting excessive radial force variations and excessive lateral force variations in a pneumatic tire having a circumferential tire tread, said method comprising the steps of:
indexing the tire tread into a series of circumferential increments $I(n)$ each of which includes a first tread region and a second laterally adjacent tread region;
obtaining a series of radial force measurements $R(n)$ corresponding to the series of circumferential increments $I(n)$ of the tire tread;
generating, for each of the increments $I(n)$, a radial grind component $R_{SGR}(n)$ which represents the amount of material removal from the corresponding increment $I(n)$ necessary to correct excessive radial force variations in the tire;
obtaining a series of lateral force measurements $L(n)$ corresponding to the series of circumferential increments $I(n)$ of the tire tread;
generating, for each of the increments $I(n)$, a first lateral grind component $L^1_{SGR}(n)$ which represents the amount of material removal from the first tread region of the corresponding increment $I(n)$ necessary to correct excessive lateral force variations in the tire, and a second lateral grind component $L^2_{SGR}(n)$ which represents the amount of material removal from the second tread region of the corresponding increment $I(n)$ necessary to correct excessive internal force variations in the tire;
generating from the grind components $R_{SGR}(n)$, $L^1_{SGR}(n)$, and $L^2_{SGR}(n)$ for each of the increments I(n), a first radial/lateral grind component $R/L^1{}_{SGR}(n)$ which represents the amount of material removal from the first tread region of the corresponding increment I(n) necessary to simultaneously correct excessive radial force variations and excessive lateral force variations in the tire, and a second radial/lateral grind component $R/L^2{}_{SGR}(n)$ which represents the amount of material removal on the second tread region of the corresponding increment I(n) necessary to simultaneously correct excessive radial and lateral force variations in the tire;

removing material from the first tread region of each increment I(n) according to the value of the corresponding first radial/lateral grind component $R/L^1{}_{SGR}(n)$; and removing material from the second tread region of each increment I(n) according to the value of the corresponding second radial/lateral grind component $R/L^2{}_{SGR}(n)$.

27. A method for simultaneously correcting excessive force variations in a pneumatic tire having a circumferential tire tread, said method comprising the steps of:

indexing the tire tread into a series of circumferential increments I(n) each of which includes a first tread region and a second laterally adjacent read region;

obtaining a series of force measurements X(n) corresponding to the series of circumferential increments I(n) of the tire tread, the measurements X(n) corresponding to forces along a non-lateral axis of the tire which is perpendicular to a lateral axis of the tire;

generating, for each of the increments I(n), a grind component $X_{SGR}(n)$ which represents the amount of material removal from the corresponding increment I(n) necessary to correct excessive force variations in the tire along the non-lateral axis; p1 obtaining a series of lateral force measurements L(n) corresponding to the series of circumferential increments I(n) of the tire tread, the lateral force measurements L(n) corresponding to forces along the lateral axis of the tire;

generating, for each of the increments I(n), a first lateral grind component $L^1{}_{SGR}(n)$ which represents the amount of material removal from the first tread region of the corresponding increment I(n) necessary to correct excessive lateral force variations in the tire, and a second lateral grind component $L^2{}_{SGR}(n)$ which represents the amount of material removal from the second tread region of the corresponding increment I(n) necessary to correct excessive lateral force variations in the tire;

generating from the grind components $X_{SGR}(n)$, $L^1{}_{SGR}(n)$, and $L^2{}_{SGR}(n)$ for each of the increments I(n), a first grind component $X/L^1{}_{SGR}(n)$ which represents the amount of material removal from the first tread region of the corresponding increment I(n) necessary to simultaneously correct excessive force variations in the tire along both the lateral and non-lateral axes, and a second grind component $X/L^2{}_{SGR}(n)$ which represents the amount of material removal on the second tread region of the corresponding increment I(n) necessary to simultaneously correct excessive force variations in the tire along both the lateral and non-lateral axes;

removing material from the first tread region of each increment I(n) according to the value of the corresponding first grind component $X/L^1{}_{SGR}(n)$; and removing material from the second tread region of each increment I(n) according to the value of the corresponding second grind component $X/L^2{}_{SGR}(n)$.

28. A method for simultaneously correcting excessive force variations along two different perpendicular axes of a pneumatic tire which has a circumferential tire tread, said method comprising the steps of:

indexing the tire tread into a series of circumferential increments I(n);

obtaining a series of force measurements X(n) corresponding to the series of circumferential increments I(n) of the tire tread, the measurements X(n) corresponding to forces along a first axis of the tire;

generating, for each of the increments I(n), a grind component $X_{SGR}(n)$ which represents the amount of material removal from the corresponding increment I(n) necessary to correct excessive force variations in the tire along the first axis;

obtaining a series of force measurements Y(n) corresponding to the series of circumferential increments I(n) of the tire tread, the measurements Y(n) corresponding to forces along a second axis of the tire, the second axis being perpendicular to the first axis;

generating, for each of the increments I(n), a grind component $Y_{SGR}(n)$ which represents the amount of material removal from the corresponding increment I(n) necessary to correct excessive force variations in the tire along the second axis;

generating from the grind components $X_{SGR}(n)$ and $Y_{SGR}(n)$, for each of the increments I(n), a grind component $X/Y_{SGR}(n)$ which represents the amount of material removal from the corresponding increment I(n) necessary to simultaneously correct excessive force variations in both the first and second axis; and removing material from each increment I(n) according to the value of the corresponding grind component $X/Y_{SGR}(n)$.

* * * * *